Feb. 4, 1958  B. T. BOWIE  2,822,205
TUBULAR ELECTRIC LIGHT CHANGING DEVICE
Filed Oct. 27, 1955  2 Sheets-Sheet 1

Benjamin T. Bowie
INVENTOR.

BY *Clarence A. O'Brien*
*and Harvey B. Jacobson*
Attorneys

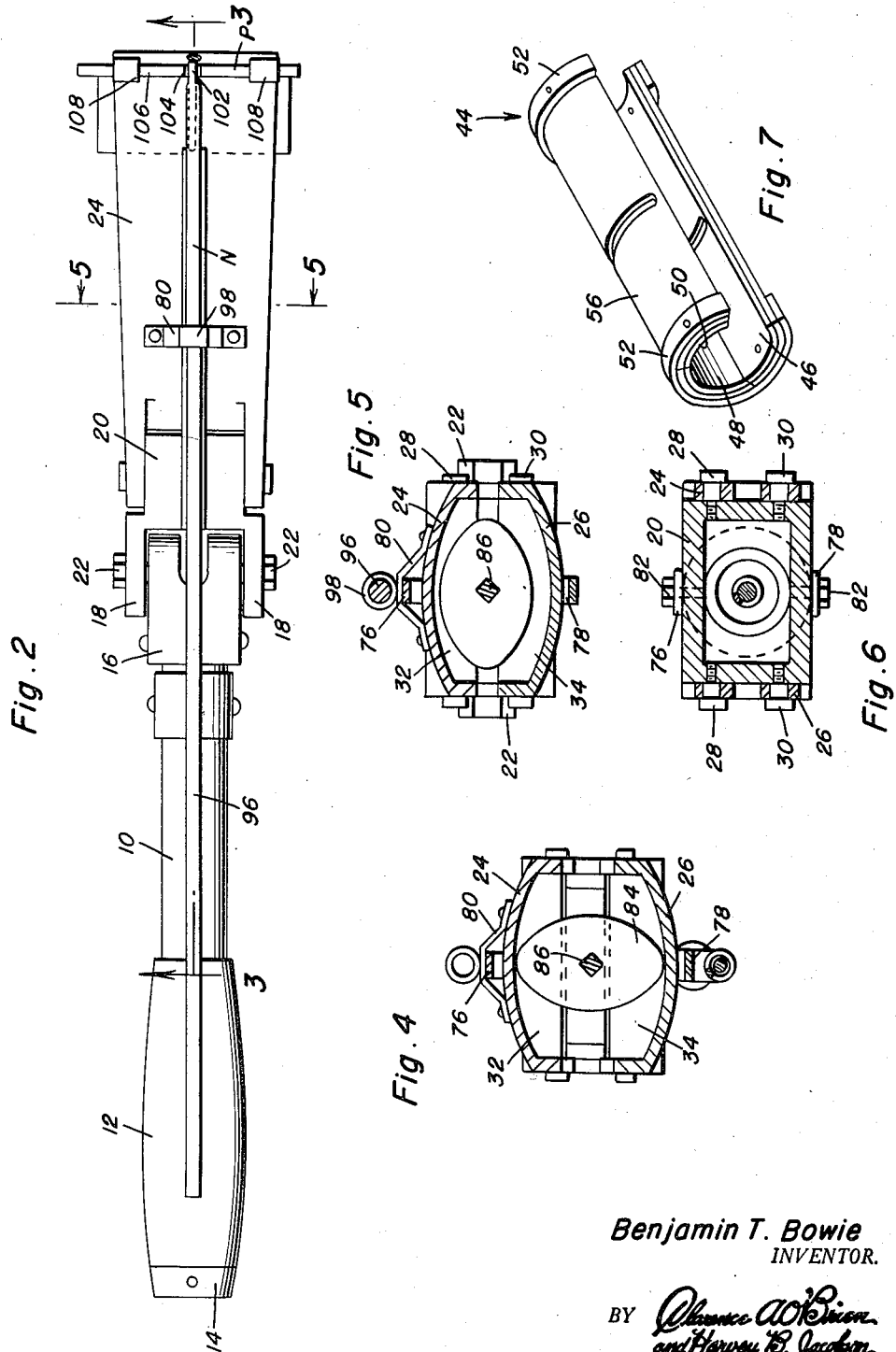

United States Patent Office 2,822,205
Patented Feb. 4, 1958

2,822,205

TUBULAR ELECTRIC LIGHT CHANGING DEVICE

Benjamin T. Bowie, Greenville, S. C.

Application October 27, 1955, Serial No. 543,151

10 Claims. (Cl. 294—21)

This invention comprises novel and useful improvements in a tubular electric light changing device, and more particularly relates to improvements over my prior Patent No. 2,669,478, issued February 16, 1954, for a Bulb Changing Device.

The principal object of this invention is to provide an improved tool particularly adapted for effectively gripping electric light tubes such as fluorescent light tubes whereby the same may be removed from or applied to conventional fluorescent light sockets.

A further object of the invention is to provide a tool in accordance with the preceding object wherein the tube gripped by the device may be rotated at its longitudinal axis, in an improved manner, in order to disengage the tube from its mounting in the electric light receptacle.

Yet another object of the invention is to provide a tool in compliance with the above mentioned objects which will enable the above mentioned rotating action to be effected while the tool itself is held in a stationary position.

A still further object of the invention is to provide a tool as described in the preceding objects which shall include means whereby a longitudinal or axial movement may be applied to the tube when grasped by the device to assist in disengaging the tube from its mounting fixtures or inserting the tube therein.

A still further important object of the invention is to provide a tool as recited in the above mentioned objects which shall include a clamping member mounted in the clamping jaws of the tool in such a manner that the clamping member may be rotated relative to the jaws of the tool for imparting the desired rotation to the fluorescent tube when held in the device.

And a final important object of the invention is to provide a tool in compliance with the preceding objects whereby the clamping device may be caused to register with the jaws of the tool in such manner that opening the jaws will open the clamping device for receiving or discharging a tube; and wherein, when the jaws and clamping device are closed, the clamping device may be independently rotated within the jaws in order to rotate the tube, together with an improved construction and arrangement of means for controlling the opening and closing action of the jaws and the clamping device, the rotation of the jaws and the actuation of a transversely slidable pin for imparting axial movement to the tube grasped by the jaws and clamping device.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 2 is a top plan view of the arrangement of Figure 1;

Figure 4 is a vertical transverse sectional detail view taken substantially upon the plane indicated by the section line 4—4 of Figure 3 and showing the cam means for opening the jaws against the resistance of the jaw closing springs;

Figure 5 is a vertical transverse sectional view taken substantially upon the plane indicated by the section line 5—5 of Figure 2 and showing certain details of the internal jaw construction of the tool;

Figure 3:
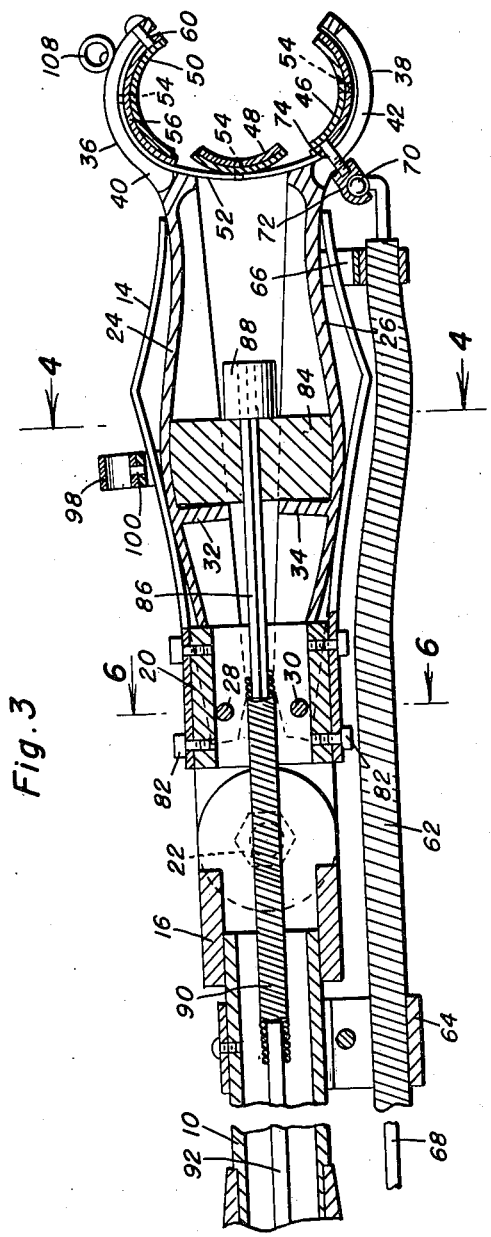
Figure 3 is a vertical central longitudinal sectional view taken upon a large scale substantially upon the plane indicated by the section line 3—3 of Figure 2, parts being broken away and showing the jaws and the clamping device therein disposed in their open position for receiving an electric light tube therein, certain concealed parts being indicated in dotted lines.

Figure 6 is a vertical transverse sectional detail view taken substantially upon the plane indicated by the section line 6—6 of Figure 3 and showing more particularly the manner in which the jaws are pivotally mounted upon the tool, together with the mounting of the jaw closing springs and of the actuator shaft for the jaw opening cam; and Figure 7 is a perspective view of the resilient and radially extensible clamp constituting a tube gripping and rotating member and which is secured in and rotatably receivable in transverse extension of the jaws.

In the accompanying drawings, it will be seen that the novel tool for changing electric lamp tubes in accordance with this invention comprises an elongated tubular handle 10 having at its outer end a tubular hand grip 12 of any suitable material and which is rotatably received upon the handle, being provided with a closure cap or plug 14.

At what may be termed its forward end, the tubular handle 10 extends into a tubular bore in a connecting body 16. Any suitable means may be provided for rigidly connecting the handle and the body. The body, in turn, is received within the furcations 18 which extend from the laterally enlarged end of a member 20, suitable bolts 22 serving to pivot and retain the member 16 within the bifurcation of the member 20.

The member 20, which is substantially square in cross-section and is hollow as shown by Figure 6, constitutes a base to which the movable jaws of this tool are pivoted.

As viewed in the drawings, the movable jaws include an upper jaw 24 together with a lower jaw 26. At their rear ends, these jaws are bifurcated as will be apparent from Figure 2, and the bifurcated ends of the jaws embrace the member 20 and are pivotally secured thereto as by fastening bolts 28 for the upper jaw and 30 for the lower jaw. Referring to Figure 4 it will be seen that the jaws are outwardly convexed, that is, are upwardly dished and downwardly dished for the upper and lower jaws respectively.

Intermediate their ends, the interior or concave surfaces of the movable jaws are provided with transversely extending partitions 32 and 34, as shown best in Figures 3, 4 and 5.

The outer ends of the jaws extend transversely and provide complementary semicylindrical recesses in the transverse extensions 36 and 38 respectively of the upper and lower jaws. These extensions are provided with arcuate slots 40 and 42, respectively, extending therethrough for a purpose subsequently set forth.

Referring now to Figure 7, it will be seen that there is provided a resilient, radially expansible cylindrical sleeve 44 constituting a clamp. This sleeve is adapted to be rotatably received in the semicylindrical recesses in the jaw extensions 36 and 38. Conveniently, the clamp sleeve consists of three arcuate semicylindrical segments indicated at 46, 48 and 50, respectively. Resilient arcuate springs 52 extend circumferentially about the exterior of these segments and are secured to each of the segments as by rivets 54. As will be observed from Figures 3 and 7, the clamp sleeve is assembled in the jaw extensions by placing the three segments 46, 48 and 50 on the concave or inner surface of the cylindrical plates 56 which constitute the inner bearing surfaces of the jaw extensions, with the resilient arcuate strips 52 being disposed upon the exterior concave surface of the plates 56. Thus, the members 52 serve to resiliently retain the segments of the clamping sleeve against the jaw extensions and also apply a yielding closing force to the jaws. By means of rivets or bolts 60 or other fasteners, the two end segments of the clamping sleeve 46 and 50 are retained upon the jaw extensions, the fasteners extending through and being slidably received in the previously mentioned slots 40 and 42. It will thus be apparent that the clamping sleeve may be rotated about its longitudinal axis in the jaw extensions within the limits imposed by the ends of the slots 40 and 42 upon the fastening or retaining means 60.

Figure 1:
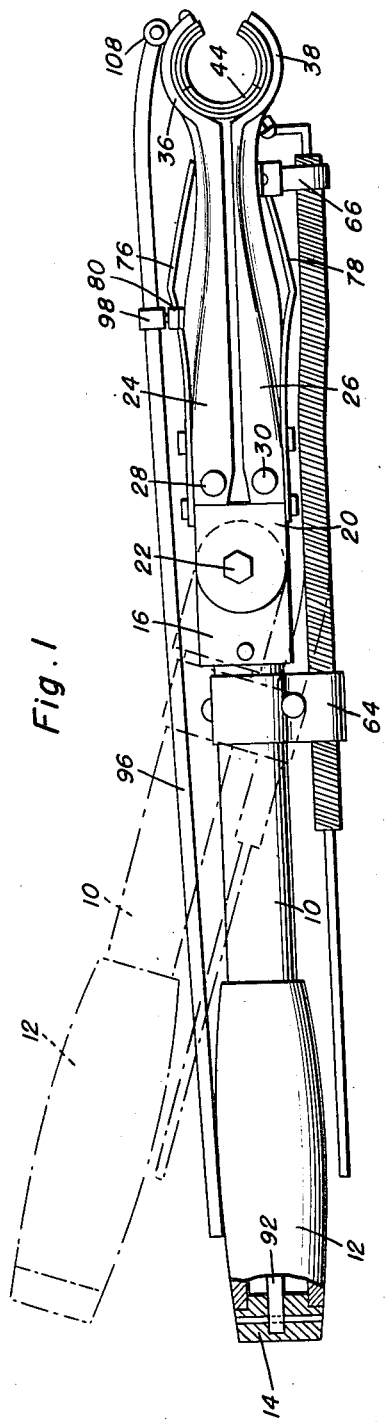
Figure 1 is a side elevational view, parts being broken away and shown in section, and an alternative position of certain of the parts being shown in dotted lines therein, of a preferred embodiment of tool incorporating therein the principles of this invention.

At this point it should be noted that as shown in Figures 1 and 3, the open end of the jaw extensions provide a transversely disposed slot and the clamping sleeve disposed therein also has a transversely disposed slot which is alignable therewith. Consequently, when the jaws are in their open position, they will also open the clamping sleeve as shown in Figure 3 whereby a tubular article such as an electric light tube may be received therein. Then, upon closing of the jaws, the clamping sleeve will grip the tube and the sleeve may then be rotated within the closed jaws in order to rotate the tube and thus disengage it from its mounting receptacle.

In order to rotate the clamping sleeve within the jaws, there is provided a push-pull connection. Thus, a flexible tubular housing 62 is secured as by a clamp 64 to the tubular handle 10 and by a further clamp 66 to the lower jaw 26. An axially reciprocable actuating rod 68 is slidably received within this housing, and at its forward extremity is provided with a ball connector 70 cooperating with a socket 72 carried by the fastening stem 74 which extends through the slot 42 on the lower jaw extension and is rigidly connected to the lower clamping sleeve segment 46. It will thus be seen that by reciprocating the member 68, the clamping sleeve may be rotated within the jaw extensions as previously set forth.

The jaws are provided with closure springs which tend to yieldingly urge the same into closed position. The upper spring 76 extends through retainer bracket 80, as will be apparent especially from Figures 4 and 5. At their rear ends, these springs are secured to the member 20 by the fastening screws 82, while the forward ends of these springs bear against the forward end of the jaws adjacent to the transverse extensions 36 and 38 thereof.

In order to actuate the jaws and the clamping sleeve to their open positions, a jaw opening mechanism of the same general character as that set forth in my above mentioned prior patent is employed. This includes a cam 84 which is mounted upon a cam actuating shaft 86, the cam being positioned adjacent the above-mentioned partitions 32 and 34, and being secured to the shaft 86 as by a collar 88. At its rear end, the shaft 86 is fixedly secured to a flexible tubular shaft 90 which extends through the members 20 and 16, and into the end of the tubular housing 10, where the flexible tubular shaft 90 is fixedly secured to a rigid operating rod 92. The latter, in turn, is fixedly connected to the plug or closure member 14 of the sleeve 12, whereby rotation of this hand grip 12 will effect rotation of the cam and actuate the jaws to an open position.

Means are also provided to impart an axial thrust to the jaws and the clamping sleeve therein in order to axially shift the tube to assist in its removal from or its insertion into its mounting receptacle. For this purpose there is provided a lever 96 which, adjacent its forward end, is slidably received in a guide block 98, see Figure 3, which is pivoted as at 100 to the above mentioned bracket 80. At its extreme forward end the lever is provided with a narrow finger 102 which is received within a circumferential groove 104 in a transversely extending pin 106. The latter in turn is slidably received in guide brackets 108 carried by the upper jaw 36. By shifting the lever from side to side, the ends of the pin 106 which extend considerably beyond the ends of the jaw extensions and the clamping sleeve carried thereby may be adjustably positioned beyond either side or end of the clamping sleeve and jaw extension whereby they may be engaged against the tube receptacle or to assist in removing the tube therefrom or in moving the tube endwise relative thereto as for insertion into the mounting receptacle.

It will be noted that the pivotal connection of the handle to the member 20, as shown in full and dotted lines in Figure 1, permits the handle to be angularly positioned relative to the jaw portion of the device to facilitate the application of the tool to an electric light tube and its fixture.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool for changing lamp tubes comprising an elongated handle, a pair of jaws mounted upon said handle for pivotal movement towards and from each other, said jaws having complementary semicylindrical extensions disposed laterally thereof and providing a transverse slot at their front, means carried by said handle for opening and closing said jaws and operatively associated therewith, a clamp received in said extensions, said clamp comprising a longitudinally slitted resilient cylindrical sleeve, means mounting said clamp upon said extensions for rotary movement about an axis extending transversely of the horizontal axis of said handle, said clamp being rotatably positionable in said extensions with its slit aligned with said transverse slot, actuating means mounted upon and carried by said handle and operatively engaging said clamp for causing rotation of said clamp in said extensions.

2. The combination of claim 1 wherein said clamp includes arcuate segments, said mounting means securing the segments adjacent said slit to said extensions for opening and closing movement therewith.

3. The combination of claim 1 wherein said clamp includes arcuate segments, said mounting means securing the segments adjacent said slit to said extensions for opening and closing movement therewith, said mounting means including arcuate circumferentially extending channels in one of said segments and a retainer slidably secured in said channel and fixedly secured to the other of said extensions and segments.

4. The combination of claim 1 wherein said clamp includes arcuate segments, said mounting means securing the segments adjacent said slit to said extensions for opening and closing movement therewith, said mounting means including arcuate circumferentially extending channels in one of said segments and a retainer slidably secured in said channel and fixedly secured to the other of said extensions and segments, said actuating means extending through one of said extensions and being connected to said clamp.

5. A tool for changing lamp tubes comprising an elongated handle, a pair of jaws mounted upon said handle for pivotal movement towards and from each other, said jaws having complementary semicylindrical extensions disposed laterally thereof and providing a transverse slot at its front, means carried by said handle for opening and closing said jaws, a clamp received in said extensions, said clamp comprising a longitudinally slitted resilient cylindrical sleeve, means mounting said clamp upon said extensions for rotary movement about an axis extending transversely of the horizontal axis of said handle, said clamp being rotatably positionable in said extensions with its slit aligned with said transverse slot, actuating means for causing rotation of said clamp in said extensions, a pin journaled on one of said extensions and extensible beyond the adjacent end thereof for sliding movement transversely thereof, an actuator on one of said jaws and engaging said pin for effecting sliding movement thereof, said pin being projectable beyond the ends of said jaws for abutting engagement with a portion of a lamp tube socket whereby to effect movement of said jaws and a lamp tube clamped therebetween from said lamp tube socket upon operation of said actuator.

6. The combination of claim 5 wherein said actuator comprises a lever having a finger at one end, said pin having a recess receiving said finger.

7. The combination of claim 5 wherein said actuator comprises a lever having a finger at one end, said pin having a recess receiving said finger, a guide slidably receiving said lever, a pivot connecting the guide to said jaw.

8. The combination of claim 1 wherein said clamp includes arcuate segments, said mounting means securing the segments adjacent said slit being secured to said extension for opening and closing movement therewith, a pin journaled on one of said extensions and extensible beyond the adjacent end thereof for sliding movement transversely thereof, an actuator on one of said jaws and engaging said pin for effecting sliding movement thereof.

9. The combination of claim 1 wherein said clamp includes arcuate segments, said mounting means securing the segments adjacent said slit to said extensions for opening and closing movement therewith, a pin journaled on one of said extensions and extensible beyond the adjacent end thereof for sliding movement transversely thereof, an actuator on one of said jaws and engaging said pin for effecting sliding movement thereof, said pin being projectable beyond the ends of said jaws for abutting engagement with a portion of a lamp tube socket whereby to effect movement of said jaws and a lamp tube clamped therebetween from said lamp tube socket upon operation of said actuator, wherein said actuator comprises a lever having a finger at one end, said pin having a recess receiving said finger.

10. The combination of claim 1 wherein said opening means is carried by and disposed between said jaws, an operator for said opening means disposed in said handle.

References Cited in the file of this patent
UNITED STATES PATENTS

| | | |
|---|---|---|
| 2,371,437 | Gaynor et al. | Mar. 13, 1945 |
| 2,669,478 | Bowie | Feb. 16, 1954 |